(12) United States Patent
Burgbacher et al.

(10) Patent No.: US 6,281,616 B1
(45) Date of Patent: Aug. 28, 2001

(54) CLAW POLE MOTOR

(75) Inventors: Martin Burgbacher; Frank Jeske, both of St. Georgen (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/381,666

(22) PCT Filed: Jul. 17, 1998

(86) PCT No.: PCT/DE98/02001

§ 371 Date: Feb. 16, 2000

§ 102(e) Date: Feb. 16, 2000

(87) PCT Pub. No.: WO99/05769

PCT Pub. Date: Feb. 4, 1999

(30) Foreign Application Priority Data

Jul. 24, 1997 (DE) .......................... 297 13 162 U (51) Int. Cl.$^7$ .......................... H02K 29/00; H02K 29/06
(52) U.S. Cl. .......................... 310/257; 310/254; 310/49 R
(58) Field of Search .......................... 310/68 B, 254, 310/257; 29/596–598

(56) References Cited

U.S. PATENT DOCUMENTS

| | | | |
|---|---|---|---|
| 3,978,355 | 8/1976 | Hoefert et al. | 310/74 |
| 4,656,381 | * 4/1987 | Komatsu | 310/257 |
| 4,891,567 | * 1/1990 | Fujitani et al. | 318/254 |
| 5,148,069 | * 9/1992 | Nonaka et al. | 310/68 R |
| 5,486,742 | 1/1996 | Chino et al. | 318/254 |
| 5,747,908 | 5/1998 | Saneshiga et al. | 310/91 |
| 5,757,100 | 5/1998 | Burgbacher | 310/186 |
| 5,831,359 | 11/1998 | Jeske | 310/68 B |

FOREIGN PATENT DOCUMENTS

| | | |
|---|---|---|
| 658 151 | 10/1986 | (CH) . |
| 30 49 191 C2 | 10/1981 | (DE) . |
| 35 02 284 A1 | 7/1986 | (DE) . |
| 296 16 169 U1 | 1/1997 | (DE) . |
| 0 265 195 A2 | 4/1988 | (EP) . |
| 0 752 749 A | 1/1997 | (EP) . |
| 0 766 370 A2 | 4/1997 | (EP) . |
| 2 269 744 | 11/1975 | (FR) . |
| 2067024 | 7/1981 | (GB) . |

OTHER PUBLICATIONS

Patent Abstracts of Japan, vol. 14, No. 216, E–924, abstracting JP 2–51352–A of Feb. 21, 1990. Matsushita/Minebea Co. Ltd.

Patent Abstracts of Japan, vol. 19, No. 263, E–1550, abstracting JP 6–38492–A of Feb. 10, 1994, Oike/Yazaki Corp.

Patent Abstracts of Japan, pub. No. 06 296 357–A of Oct. 21, 1994, RI +/Mabuchi Motor Co. Ltd.

Patent Abstracts of Japan, pub. No. 08 242 569–A of Sep. 17, 1996, Tsukitani/Matsushita.

* cited by examiner

*Primary Examiner*—Tran Nguyen
(74) *Attorney, Agent, or Firm*—Milton Oliver; Ware, Fressola, Van Der Sluys & Adolphson LLP (57) ABSTRACT

An electronically commutated claw pole motor has an external rotor (42) with a shaft (40) and a rotor magnet (62). The claw pole motor contains a stator (64) which has a first soft ferromagnetic stator pole piece (74) located on its side facing away from the external rotor (42). The stator pole piece is provided with first claw poles (82, 84) projecting toward the external rotor (42). The stator has a second soft ferromagnetic stator pole piece (76) located on its side facing the external rotor (42). The second soft ferromagnetic pole piece is provided with second claw poles (88, 90) extending from the external rotor (42) and having a larger axial extension (h2) than the first claw poles (82, 84) and projecting into gaps (92) between the first claw poles (82, 84). An axial bearing (44, 46) supports the end (44) of the shaft (40) which faces away from the external rotor (42). In order to generate a magnetic force (F) acting on this bearing, the rotor magnet is displaced, relative to the stator (64), in a direction away from the axial bearing (40, 44).

15 Claims, 10 Drawing Sheets

CLAW POLE MOTOR

This application is a national phase application under § 371 of PCT/DE98/02001 filed Jul. 17, 1998.

FIELD OF THE INVENTION

The invention relates to a claw pole motor, and in particular to an electronically commutated claw pole motor.

BACKGROUND

Motors of this kind are often extremely small, and can have, for example, an outside diameter of less than 2 cm. They are preferably used to drive small fans for direct cooling of the processor in computers, and since only very limited space is available on a computer circuit board, a low overall height for such motors is desirable; their operation must nevertheless be absolutely reliable.

A motor known from EP 766 370 A2 and corresponding U.S. Pat. No. 5,831,359, JESKE, has a relatively large overall height, since in it, the interaction of the permanent magnet of the external rotor and the claw pole arrangement of the interior stator must generate on the rotor a magnetic pull which ensures that the shaft is pressed with sufficient force onto the axial bearing. For this purpose, in this motor the rotor and stator must be highly offset in the axial direction.

It is therefore an object of the invention to make available a new claw pole motor, in particular a subminiature motor, that is suitable, for example, as a fan drive system for cooling microprocessors.

SUMMARY OF THE INVENTION

According to the invention, this object is achieved by asymmetrical shaping of the claw poles, to thereby displace the magnetic symmetry planes of the stator and rotor. It thereby becomes possible either to increase the axial magnetic pull acting on the rotor, or to reduce the overall height of the motor, or also to take a combination of these measures.

Further details and advantageous developments of the invention are evident from the exemplary embodiments—which are not to be understood in any way as a limitation of the invention—that are described below.

DETAILED DESCRIPTION

The invention is preferably utilized in very small motors, and is therefore described below using the example of a fan for cooling a microprocessor, i.e. a so-called processor fan. Since such fans are extremely small, the drawings must be very greatly enlarged. For better comprehension, a scale bar 1 cm in length is shown as an example on the right in FIG. 1 in order to illustrate the size relationships. A depiction at 1:1 scale obviously would not have been possible.

The reference number 10 designates a microprocessor (or other semiconductor) that must be positively cooled because it generates a great deal of heat. Mounted on it in thermally conductive fashion, in the usual manner, is a heat sink 12 made of metal. This has cooling fins 14 and (at the left) a threaded hole 16 onto which the housing 20 of a processor fan 22 can be mounted by way of a screw (indicated only schematically in FIG. 1 with a line 18). This housing 20 has an approximately cylindrical air passage 24 in the center of which the base portion 28 of an electronically commutated claw pole motor 29 is mounted via radial spokes 26, only one of which is visible.

A soft ferromagnetic bearing support tube 32 is pressed into a depression 30 in the center of base part 28. A circuit board 34 is also mounted on base part 28. As depicted, a Hall IC 35 (also depicted in FIG. 8) is mounted in a recess 37 of circuit board 34.

Pressed into bearing support tube 32 is a plain bearing (sintered bearing) 36, which supports shaft 40 of an external rotor 42 whose rotation axis is labeled 43. At its upper, free end 44, shaft 40 rests against a bearing surface 46 of base part 28 and is thereby axially supported. For this purpose, a force F that is magnetically generated acts on it upward. The generation of this magnetic force F is explained below in more detail. It is important that this force be of sufficient magnitude that, even in the position depicted, in which it hangs downward, external rotor 42 can be reliably retained on the stator.

Mounted on the upper end region of shaft 40, as an axial retainer, is a washer 41 which slings oil outward (from sintered bearing 36) that migrates upward along shaft 40, and from there migrates back to sintered bearing 36.

The lower end of shaft 40 is mounted in rotor base 50 of a rotor cup 52 (manufactured from plastic) with which multiple fan blades 54 are integrally configured, two thereof being visible. As rotor 42 rotates, blades 54 transport air in the direction of arrows 56, i.e. from bottom to top; in other words, the hot air between cooling fins 14 is drawn off upward. This results in a downwardly acting force on rotor 42 that in this case, for example, has a magnitude of 0.05 N (at a rotation speed of 3900 rpm). This force acts against force F. The weight of rotor 42 also results in a force of, for example, 0.1 N that acts against force F, i.e. the latter must be greater than 0.05+0.1=0.15 N. In practice, therefore, the magnetically generated force F must in this example have a magnitude of at least 0.2 N in order to ensure reliable axial support of rotor 42 in all positions of fan 22.

Mounted in the interior of rotor cup 52 by plastic injection molding is a soft ferromagnetic armature piece 60; mounted in that is a radially magnetized annular magnet 62 (rotor magnet) that can be magnetized in the circumferential direction in four-pole and (preferably) trapezoidal fashion. Its upper end is located approximately opposite Hall IC 35, so that rotor magnet 62 controls Hall IC 35 with its leakage field. As depicted, Hall IC 35 is radially offset slightly inward with respect to the upper end of magnet 62. The advantages thereby obtained are explained below with reference to FIG. 12.

Mounted on the outer side of bearing support tube 32 is an interior stator 64, details of which are depicted in the subsequent Figures. Located in its interior is a winding former 66, on which is wound (as depicted) an annular coil 68 that is therefore arranged concentrically with shaft 40. Interior stator 64 is mounted on circuit board 34 by way of rivets 70.

In the case of the present motor 29, magnetic force F is generated using an asymmetrical configuration of the magnetic circuit of stator 64. The latter contains, as already described, winding former 66 with annular coil 68, and this winding former 66 is located, in the case of a claw pole motor, between two stator pole pieces, i.e. an upper pole piece 74 and a lower pole piece 76. Upper pole piece 74 has an annular inner segment or collar 78 that presses onto bearing support tube 32 and is thereby mounted on it. Lower pole piece 76 also has an annular inner segment or collar 80 that is also pressed onto bearing support tube 32. Winding former 66 with its coil 68 is thus held between pole pieces 74, 76.

Figure 2:
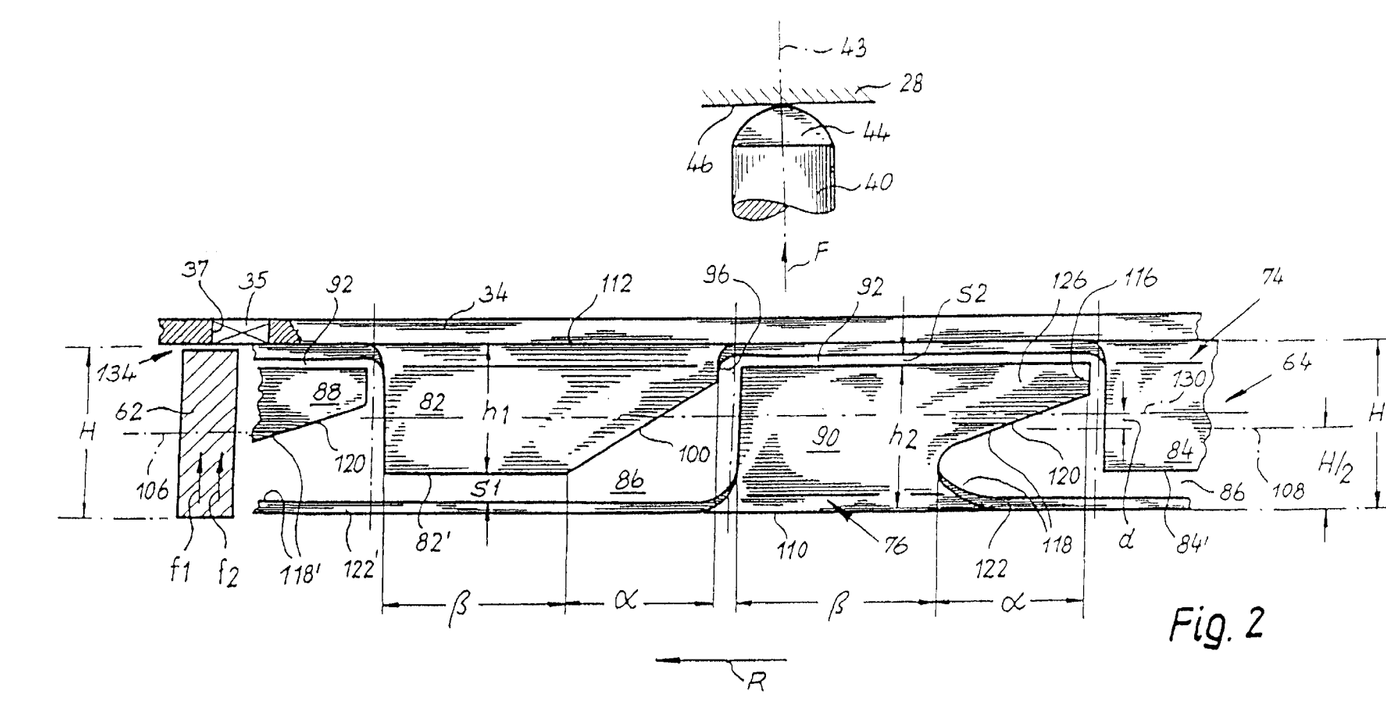
FIG. 2 shows a developed view of the claw poles of the claw pole arrangement used in the motor of FIG. 1.

Upper pole piece 74 rests directly on circuit board 34 and, as shown in FIG. 2, has two claw poles 82, 84 of identical shape that project axially downward from above into corresponding gaps 86 that are configured between the upward-facing claw poles 88, 90 of lower pole piece 76. Claw poles 88, 90, conversely, project into gaps 92 between claw poles 82 and 84.

Figure 3:
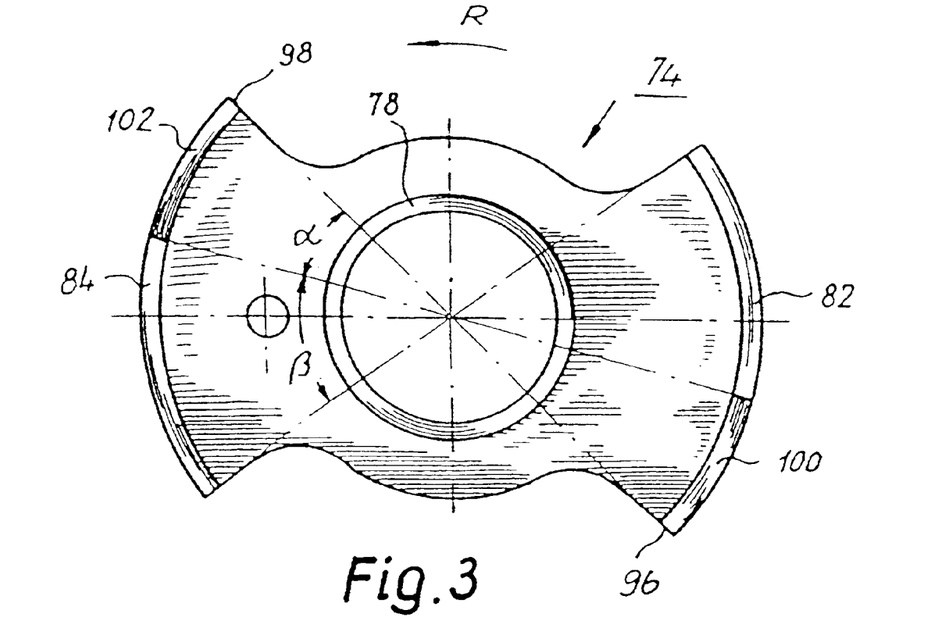
FIG. 3 shows a plan view of upper pole piece 74 of FIGS. 1 and 2, viewed in the direction of arrow III of FIG. 4.
Figure 4:
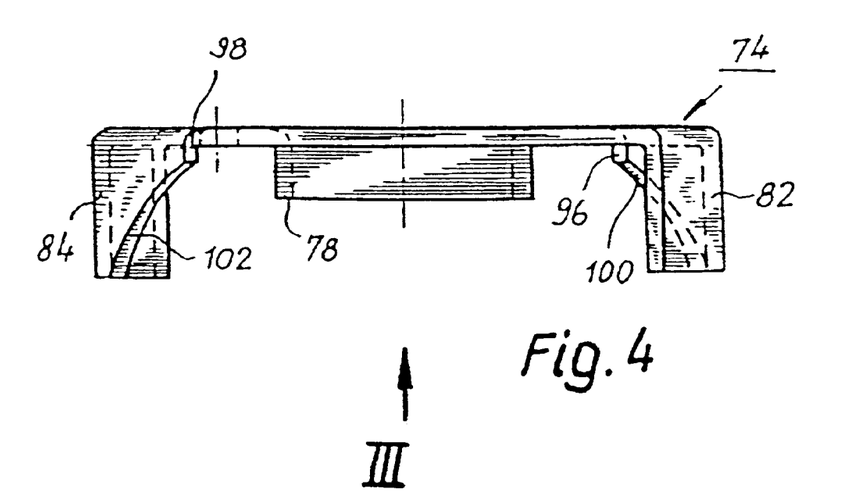
FIG. 4 shows a side view of upper pole piece 74.

The shape of upper pole piece 74 is best appreciated from FIGS. 3 and 4, in which the rotation direction of rotor 42 is labeled R. It is evident that claw poles 82, 84, proceeding from their leading edges 96 and 98, each become wider in the rotation direction in an angular region $\alpha$, and for that purpose have an oblique edge 100 and 102. In the adjacent rotation angle region $\beta$, their width h1 is constant (in terms of the axial direction). Typical values are $\alpha=60°$ el., $\beta=100°$ el.

In a usual claw pole motor such as shown, for example, in EP 766 370 A2, the claw poles of the upper pole piece and lower pole piece are identical, i.e. in the known motors, the interior stator has a symmetrical structure.

In contrast thereto, in the case of the present invention, pole pieces 74 and 76 are of different configuration (cf. FIG. 2) in order to yield an asymmetrical configuration of the stator. This asymmetrical configuration meets the additional condition of making possible a reluctance torque shape that is necessary for operation of the motor. (The reluctance torque occurs upon rotation as a result of coaction between the permanently magnetized rotor 62 and the soft iron masses of the claw poles that are located opposite rotor 62.)

For better comprehension, FIG. 2 depicts rotor magnet 62 (in section only, and sketched) and axial bearing 44, 46. Rotor magnet 62 has a magnetic center plane 106 that runs perpendicular to rotation axis 43. This center plane 106 would, if a homogeneous magnet were cut apart there, divide it into two substantially identical rings. Interior stator 64 has a geometrical center plane 108, i.e. if stator 64 has a total height H, its geometrical center plane 108 is at a distance H/2 from both axial end faces 110, 112 of stator 64.

The two claw poles 88, 90, of which only one is depicted completely in FIG. 2, have the same shape, so that a description and depiction of claw pole 90 will suffice. At its leading edge 116, the latter has a cutout 118 of length $\alpha$ adjoining which is a portion of claw pole 90 with length $\beta$; no cutout is present in the latter part.

A characteristic of cutout 118 (or 118' in claw pole 88) is that it tapers, i.e. becomes narrower, in rotation direction R. This is accomplished preferably by way of an oblique profile on its upper periphery 120 or 120', while lower periphery 122 or 122' runs perpendicular to rotation axis 43 and is located as far down as possible. Conversely, however, periphery 122 or 122' could also extend obliquely, and periphery 120 could extend perpendicular to rotation axis 43. In this case, however, force F would be smaller.

Oblique periphery 120 or 120' runs substantially parallel to edge 100 of claw pole 82, in terms of the developed view of FIG. 2.

The result of this configuration of claw poles 88, 90 is that part 126 of these claw poles, depicted in gray in FIG. 2 for claw pole 90, is shifted one "floor" upward, so to speak, as compared to a pole piece shown in FIGS. 3 and 4.

In addition, one proceeds according to the invention preferably in such a manner that axial extension h1 of upper claw poles 82, 84 is smaller than axial extension h2 of lower claw poles 88, 90, i.e. axial gap s1 between lower pole piece 76 and lower end 82', 84' of upper claw poles 82, 84 is larger than axial gap s2 between upper pole piece 74 and the upper ends of lower claw poles 88, 90. (An embodiment in which h1=h2 would also be possible, but force F would then be smaller.)

The result thereof is that a force f1, which attempts to bring magnetic center plane 106 of rotor 62 into alignment with magnetic symmetry plane 130 of stator 64, acts in an upward direction on rotor magnet 62, which is located in the position shown in FIG. 2. This magnetic symmetry plane 130 of stator 64 lies a distance d higher than its geometrical center plane 108. This is therefore a consequence of the "height offset" of segments 126, and of the different gaps s1 and s2.

There is also a second effect: As already described, rotor magnet 62 controls, with its axial leakage field, Hall IC 35, that is arranged in a recess 37 of circuit board 34. This Hall IC 35 is also depicted in FIG. 2 for illustrative purposes. In order to allow this control action, only a small axial air gap 134, for example of 0.3 mm, is present between Hall IC 35 and the upper end of rotor magnet 62. As a result, rotor magnet 62, which preferably has the same height H as stator 64, is offset downward with respect to the latter by a magnitude equal to said air gap 134, i.e. for example by 0.3 mm; this results in an additional upward-acting force f2 on rotor magnet 62, since at both axial ends of rotor magnet 62 the magnetic fields are distorted by this offset, and this distortion results in force f2. This applies in particular in the case of the practically rectangular magnetic flux density distribution existing here in the axial direction on rotor magnet 62.

Figure 1:
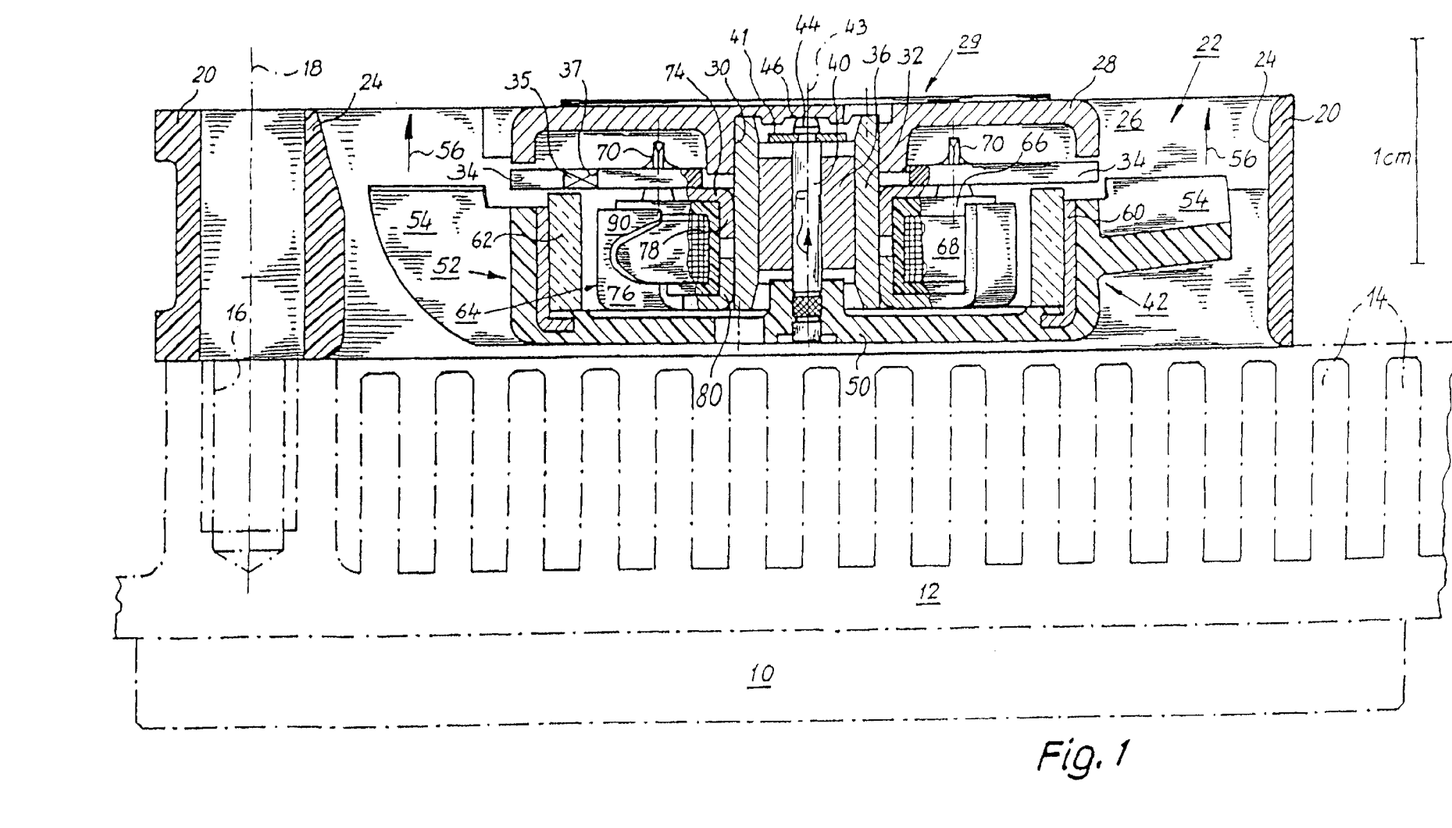
FIG. 1 shows a longitudinal section through a fan having an electronically commutated subminiature claw pole motor according to the invention, at greatly enlarged scale; in reality a motor of this kind can have, for example, a diameter of approximately 2 cm.

Forces f1 and f2 add up to yield the magnetically generated force F=f1+f2, which reliably pulls rotor 42 upward as shown in FIG. 1, and reliably holds free end 44 of shaft 40 in contact against bearing surface 46.

Figure 5:
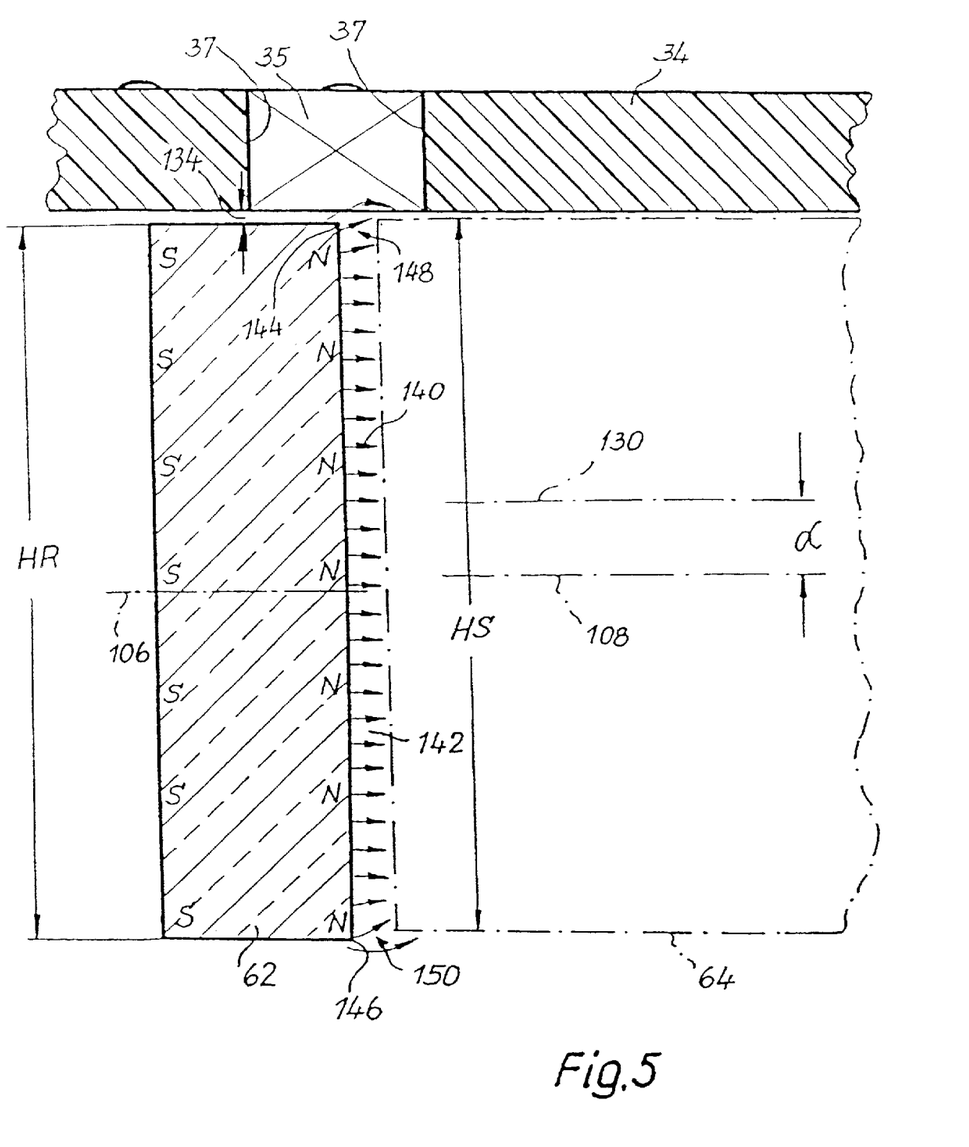
FIG. 5 shows a schematic depiction to explain the generation of a magnetic force.

FIG. 5 explains the generation of force f2. Magnetic field 140 between rotor magnet 62 and stator 64 (indicated only schematically) has a substantially homogeneous profile in air gap 142.

In the region of upper edge 144 and lower edge 146 of rotor magnet 62, however, this field is distorted in the manner depicted schematically at 148 and 150 in FIG. 5. This is the case assuming that length HR of rotor 62 is substantially identical to height HS of stator 64. If magnetic field lines 140 are imagined to be rubber filaments, these field lines are, so to speak, stretched at both edges 144 and 146 and therefore attempt to pull rotor magnet 62 upward, so that force f2 is generated in this position of rotor 62.

Force f1 is generated by the fact that the magnetic flux density in the upper region of stator 64 is somewhat higher—since more iron is present there because of the claw poles—than in the lower region; this is not depicted in FIG. 5.

Figure 6:
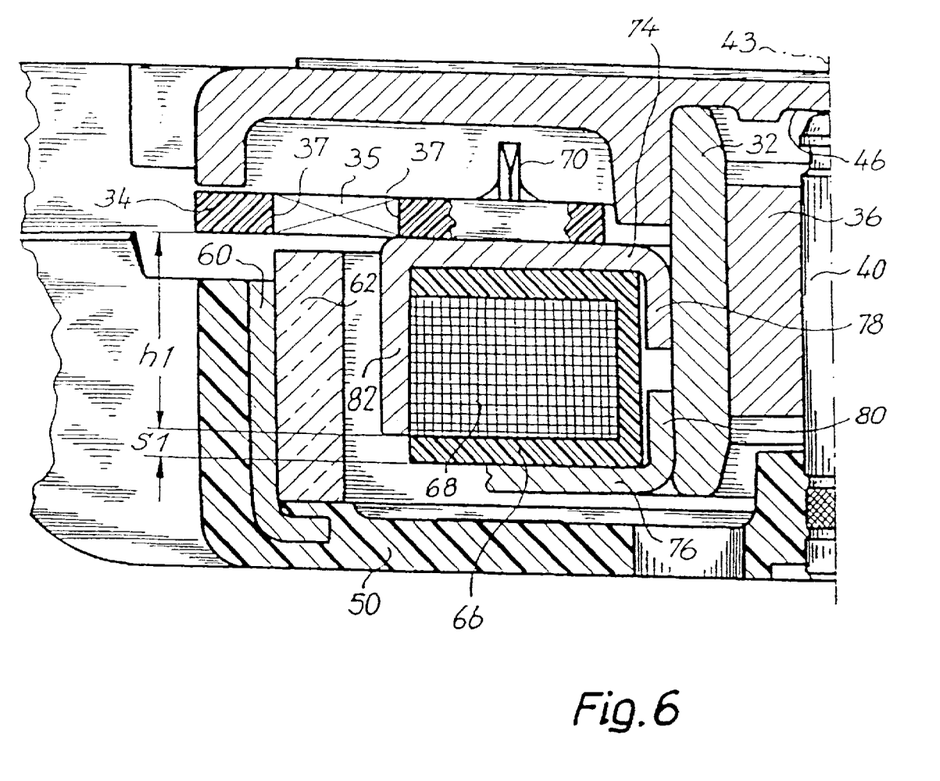
FIG. 6 shows a schematic depiction of a detail.

FIG. 6 shows, in a partial depiction, a further detail to explain the maximum gap width s1 (cf. FIG. 2). Experiments have shown that upper claw poles 82, 84 should be of a length such that they cover coil 68, as depicted in FIG. 6.

If h1 is made smaller than in FIG. 6, so that coil 68 is not covered, the result of the increased size of gap s1 is to generate leakage fluxes from coil 68 and to generate axial vibration forces on rotor 62, thus causing additional motor noise.

With a symmetrical configuration of stator 64, such axial forces would not occur even if the claw poles of both pole pieces were greatly shortened in the same fashion, since the leakage fluxes then cancel one another out. In the case of the asymmetrical design as shown in FIGS. 2, 7, or 9 through 12, however, with different gaps s1 and s2, the rule that should be followed is that h1 must be of sufficient size that upper claw poles 82, 84 cover coil 68, if it is desirable to eliminate the aforesaid motor noise.

Figure 7:
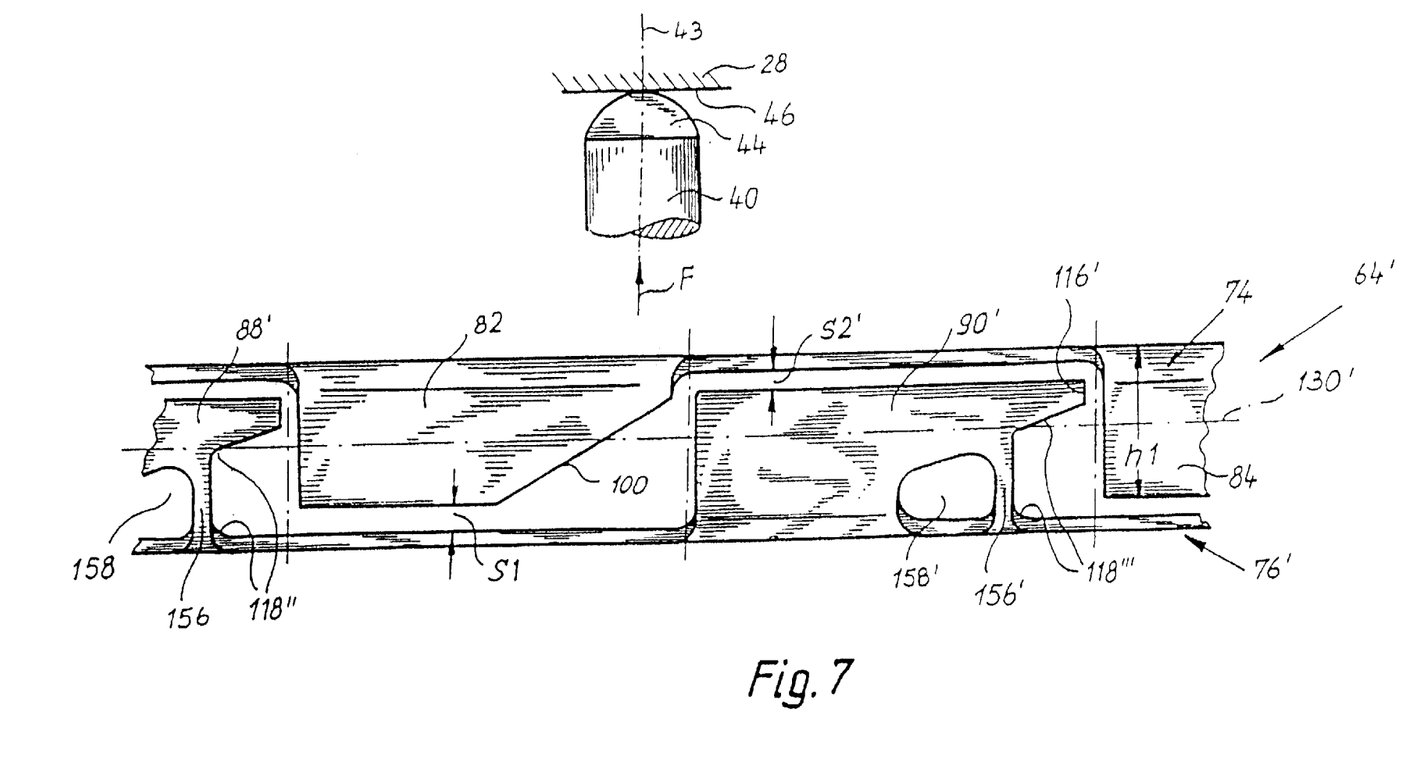
FIG. 7 shows a variant of the stator configuration of FIG. 2.

FIG. 7 shows a variant of the stator configuration of FIG. 2. The stator shown in FIG. 7 is labeled 64'. Upper pole piece 74 with its claw poles 82 and 84 corresponds to the construction already described in detail with reference to FIGS. 2 through 4.

Lower pole piece 76' has in its claw poles 88', 90' cutouts 118" and 118''', and the latter contain reinforcing struts 156, 156' that provide mechanical reinforcement of claw poles 88', 90'. It must be kept in mind in this context that these claw poles are very small and thin, and therefore could very easily be deformed under mechanical stress. It would be ideal to manufacture these reinforcing struts 156, 156' from nonmagnetic material, e.g. from brass or plastic. These reinforcing struts should preferably extend at an angle to the axial direction in order to prevent disruptive magnetically generated torques.

This design thus results in the creation, in lower claw poles 88', 90', of closed openings 158, 158' that magnetically constitute a part of recesses 118" and 118''', as is evident from a comparison of FIGS. 2 and 7.

In FIG. 7, struts 156, 156' run parallel to rotation axis 43, but preferably could also run at an angle to it. Instead of only one strut, two or three could also be provided, which can then be of thinner configuration and thus can more easily be saturated magnetically, which is advantageous here. Gap s2' is depicted here as being larger than gap s2 of FIG. 2. This gap should be as small as possible; it can also, if applicable, extend radially.

Figure 8:
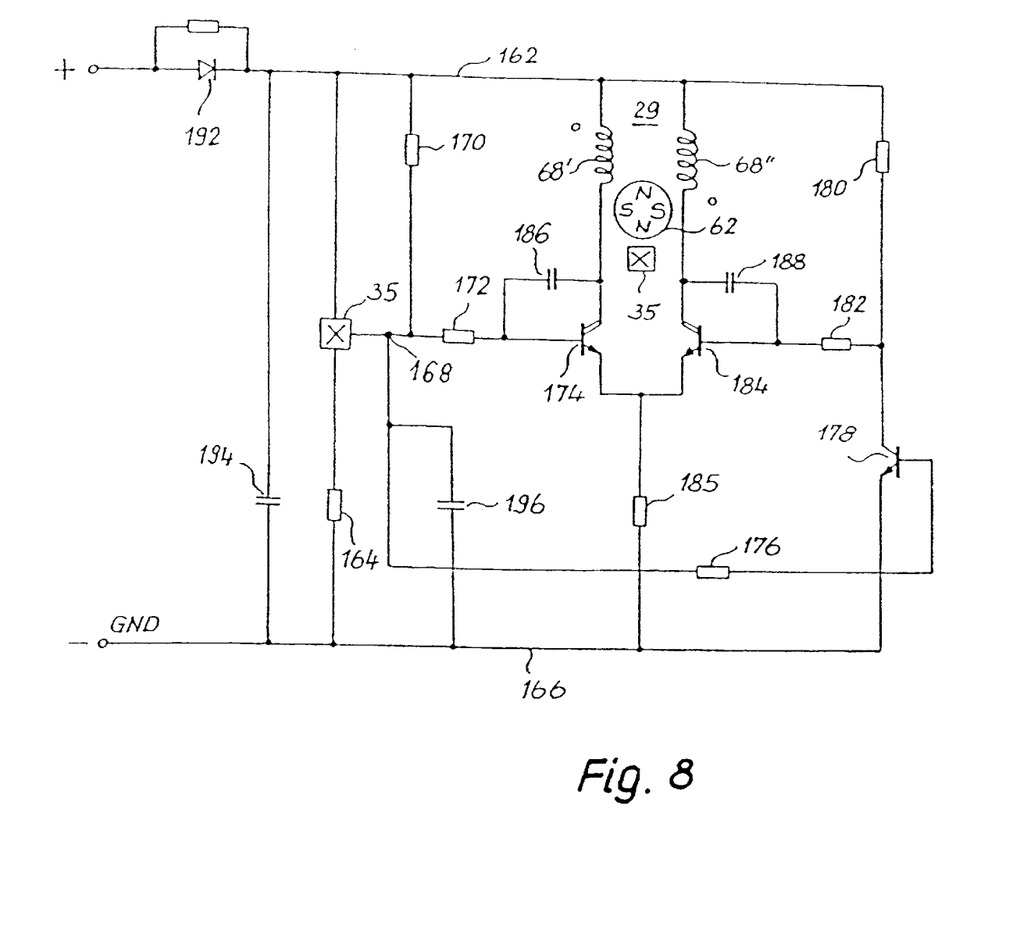
FIG. 8 shows an electrical circuit for commutating the motor according to the Figures listed above and the motor according to FIGS. 12 and 13.
Figure 9:
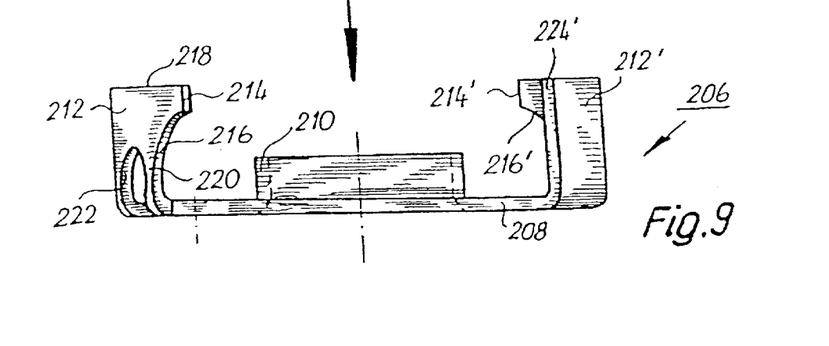
FIG. 9 shows a side view of the lower pole piece of a further embodiment of the invention.

FIG. 8 shows a circuit for operating a motor 29 according to the present invention whose rotor magnet 62 is indicated schematically. Coil 68 has a two-wire winding and therefore has two strands or phases 68' and 68" which are depicted in FIG. 8. To supply power to Hall IC 35, the latter is connected at one terminal to a positive line 162 and via a resistor 164 to a negative line 166. Its output 168 is connected via a pullup resistor 170 to positive line 162, via a resistor 172 to the base of an npn Darlington transistor 174, and via a resistor 176 to the base of an npn transistor 178 that serves as a phase reversal transistor. The emitter of transistor 178 is connected to negative line 166; its collector is connected via a resistor 180 to positive line 162, and via a resistor 182 to the base of an npn Darlington transistor 184.

The emitters of transistors 174, 184 are connected to one another and—via a common emitter resistor 185—to negative line 166. The collector of transistor 174 is connected via winding strand 68' to positive line 162. The collector of transistor 184 is similarly connected via winding strand 68" to positive line 162. Located between the collector and base of each of transistors 174, 184 is a capacitor 186, 188 (e.g. 3.3 nF) whose function is to slow down the switching operations and thereby prevent high-frequency interference during commutation.

When the axial leakage field of rotor magnet 62 causes the signal at output 168 of Hall IC 35 to become high as rotor 42 rotates, transistors 174 and 178 become conductive. Strand 68' thereby receives current, and transistor 184 becomes nonconductive because its base is connected via transistor 178 to negative line 166.

Conversely, when the signal at output 168 of Hall IC 35 becomes low as a result of the magnetic field of rotor magnet 62, transistors 174 and 178 become nonconductive. Transistor 184 then receives via resistor 180 a base current that makes it conductive, so that in this case strand 68" receives current and phase 68' is currentless.

The potential at output 168 of Hall IC 35 is controlled by the fact that either a north pole or a south pole of rotor magnet 62 is located opposite said Hall IC, i.e. the currents in phases 68', 68" are controlled by the rotational position of rotor 62.

A diode 192 prevents motor 29 from damage due to mispolarization. Capacitors 194, 196 serve to filter out interference pulses to ensure that the motor runs quietly, and also prevent interference voltages from escaping from motor 29.

Since it is possible, in the above-described motor 29, for rotor 62 to have a small axial length HR but nevertheless for a sufficient axial force F to be generated, the overall result is a considerably reduced overall height for the above-described processor fan 22 (or any other device), along with reliable operation.

In the variant according to FIGS. 9 through 13, upper pole piece 74 has the same shape that has been described in detail with reference to FIGS. 3 and 4.

Lower pole piece 206 is similar in configuration to lower pole piece 76' of FIG. 7. According to FIGS. 9 and 10 it has a flat segment 208 with an inner collar 210, and it has two claw poles 212, 212' that are symmetrical in shape; only claw pole 212 will therefore be described. The parts of claw pole 212' are labeled with the same reference characters as the parts of claw pole 212, but with the addition of an apostrophe, i.e., for example, 212' rather than 212.

In an angular region α' claw pole 212 has an iron volume that increases in rotation direction R, and in an adjacent rotation angle region β' it has a constant iron volume. For this purpose, this claw pole has on leading rim 214 an approximately semicircular cutout 216 that, however, does not extend to upper edge 218 of this claw pole 212, but rather ends below it, as depicted.

Adjoining this cutout 216 is a strut 220 whose function is to impart to claw pole 212 the necessary mechanical strength; and strut 220 is adjoined by an approximately circular cutout 222 whose nature is such that the iron volume of claw pole 212, as already explained, generally increases in rotation direction R in rotation angle region α', or, stated conversely, that recesses 216, 222 have a decreasing tendency in that rotation angle region.

In the adjacent rotation angle region β' (FIG. 10), claw pole 212 has its full axial extension, i.e. its maximum iron volume, and it ends at trailing edge 224.

Figure 12:
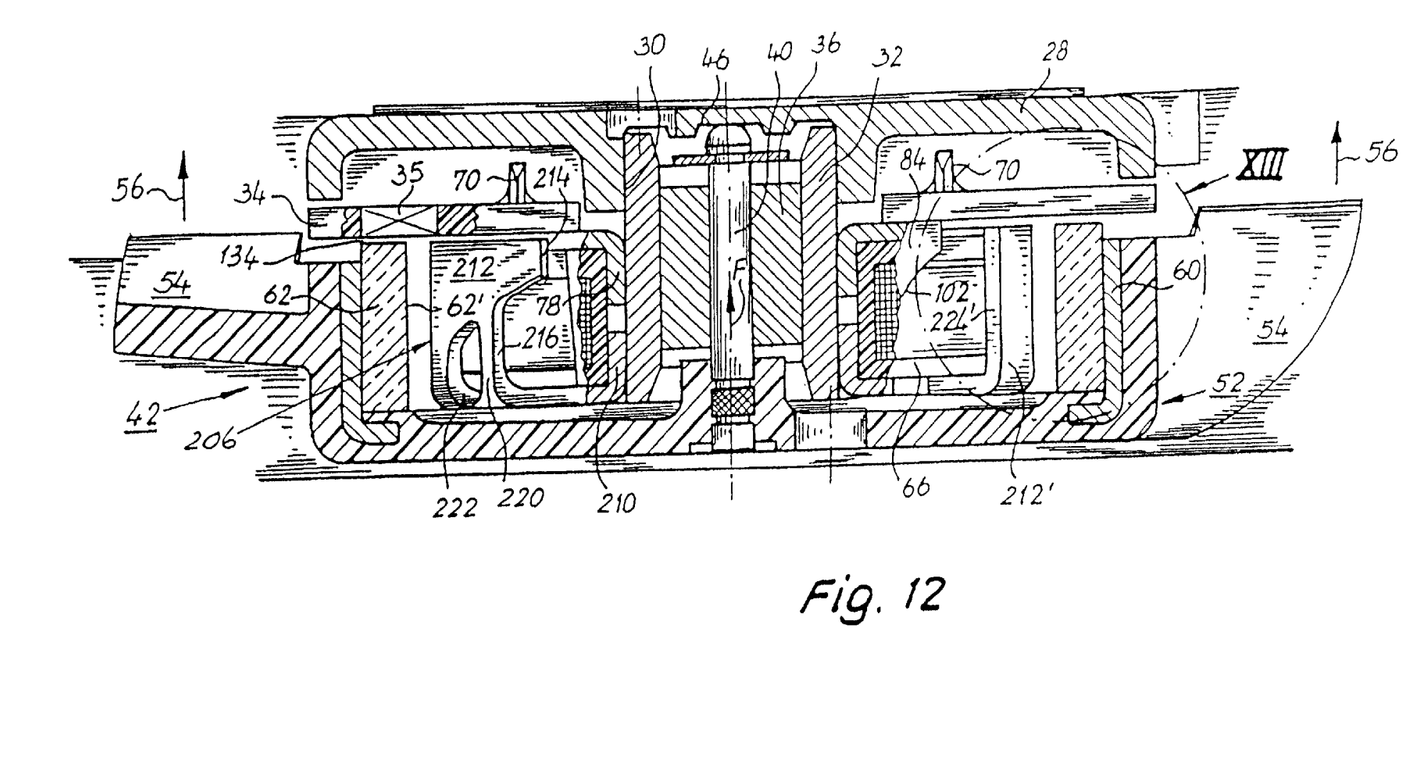
FIG. 12 shows a depiction of a claw pole motor having a lower pole piece according to FIGS. 9 through 11.
Figure 13:
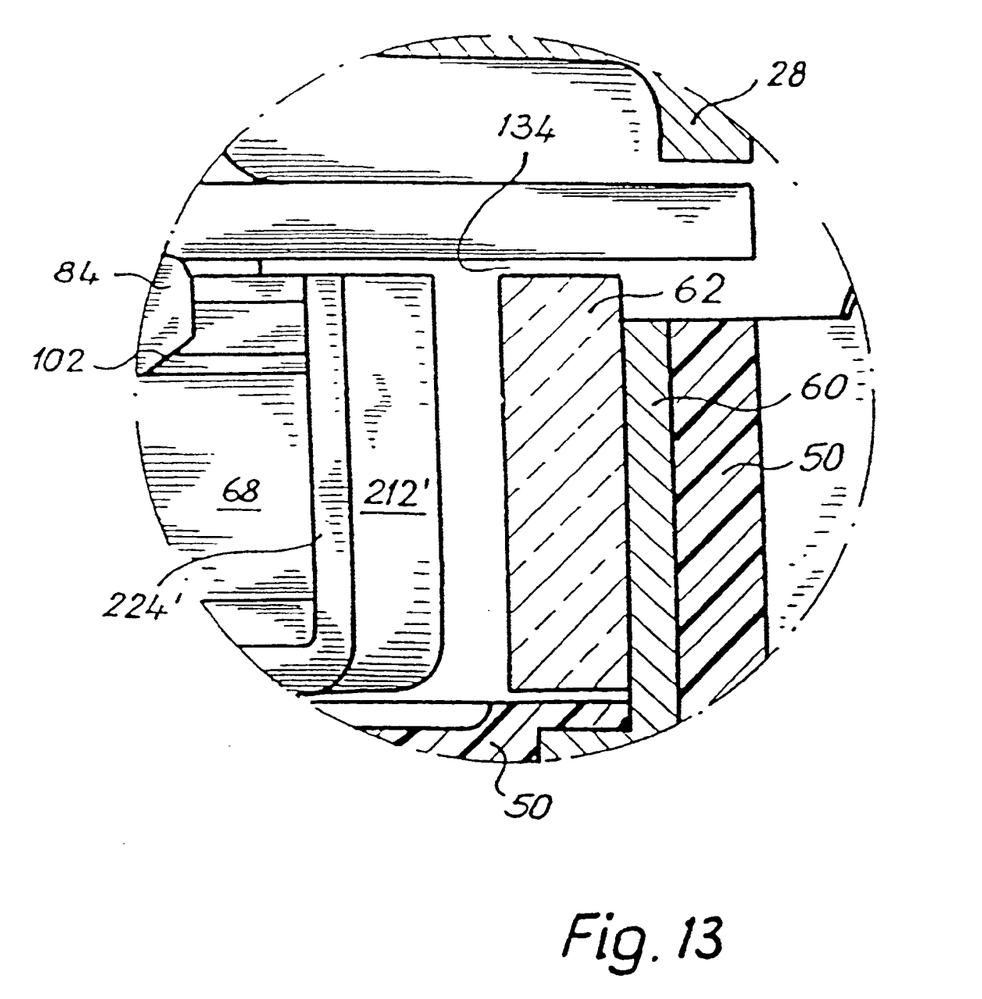
FIG. 13 shows a detail XIII of FIG. 12 in a greatly enlarged depiction.

Since the motor in FIGS. 12 and 13 is identical in mechanical configuration, in all essential aspects, to FIG. 1, the reference characters used for identical parts are the same as in FIG. 1, and these parts are not described again.

Here again, Hall generator 35 is offset radially inward in circuit board 34, so that its center lies approximately above radial inner edge 62' of rotor magnet 62. It has been found that Hall generator 35 can be more reliably controlled by the magnetic field of rotor magnet 62 with an arrangement of this kind. This is because Hall generator 35 is controlled by the leakage field of the radially magnetized magnet 62, and the leakage field attains its greatest magnetic flux density in the position depicted.

In the arrangement according to FIGS. 9 through 13 as well, a magnetic force F is created that presses shaft 40 against bearing surface 46. The generation of this force F has already been described in detail in conjunction with FIGS. 2, 5, and 7, to which reference is therefore made. What emerges as essential in the embodiment according to FIGS. 9 through 13 is that the shape of strut 220 achieves a good balance between the magnetic requirements of the motor (optimal shape for the reluctance torque that is generated) and the magnetic strength requirements of said strut and thus of claw poles 212, 212'.

Figure 10:
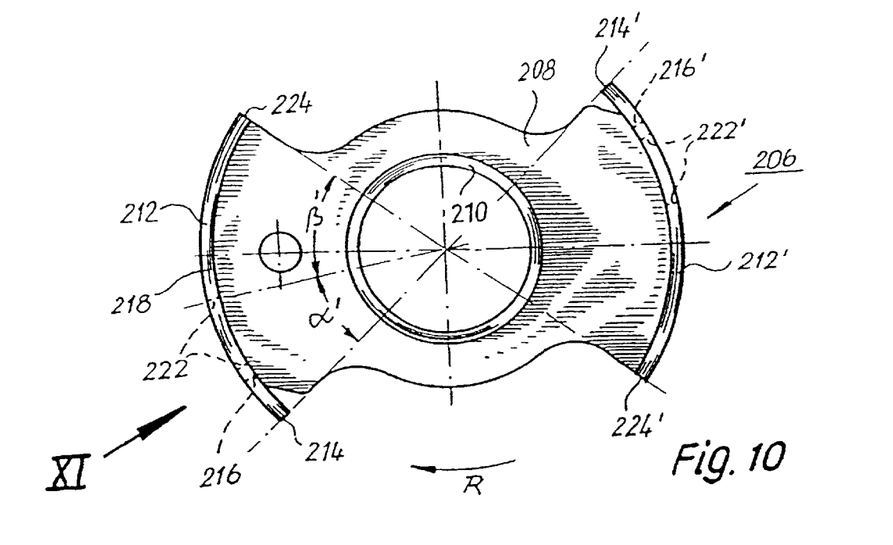
FIG. 10 shows a plan view of the pole piece of FIG. 9, viewed in the direction of arrow X of FIG. 9.
Figure 11:
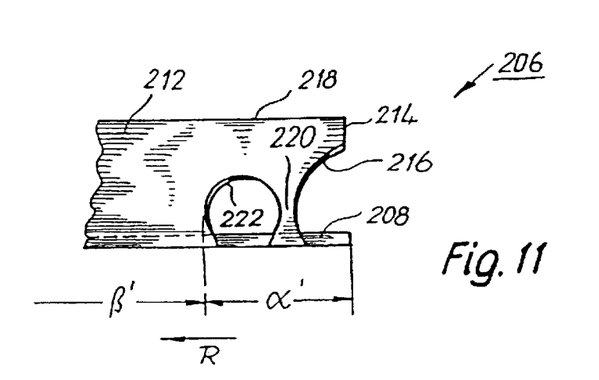
FIG. 11 shows a detail of the pole piece of FIGS. 9 and 10, viewed in the direction of arrow XI of FIG. 10 and in a developed view.

Angles α' and β' in FIG. 10 are substantially identical to angles α' and β in FIGS. 2 and 3.

Many variants and modifications are of course possible within the context of the present invention.

What is claimed is:

1. In a claw pole motor, comprising an interior stator having two soft ferromagnetic stator pole pieces provided with claw poles formed by ferromagnetic masses and separated by gaps, each claw pole projecting into an associated gap between two claw poles of a stator pole piece located opposite, said stator having a geometrical center plane;

further comprising an external rotor rotatable on a rotation axis in a circumferential direction and in which is arranged a rotor magnet having, with respect to its axial extension, a magnetic center plane extending transverse to the rotation axis, and having an axial bearing associated therewith for defining its axial position relative to the stator;

the external rotor being acted upon, in a direction toward said axial bearing, by a magnetic force (F) effective between the interior stator and the rotor magnet;

the ferromagnetic masses forming said claw poles defining a magnetic symmetry plane in such a way that the magnetic center plane of the rotor magnet, if said rotor were freely displaceable in an axial direction, would align itself with said magnetic symmetry plane;

said magnetic symmetry plane of the interior stator being furthermore offset, with respect to a geometrical center plane thereof, toward the axial bearing, by asymmetrical shaping of said claw poles, said magnetic center plane of the rotor magnet being axially offset, relative to said magnetic symmetry plane of the interior stator, in a direction away from the axial bearing.

2. The claw pole motor as defined in claim 1, wherein the claw poles have, at least partly and at least in local regions, edges running obliquely relative to the circumferential direction, so that, in these local regions, their magnetically effective width (h1, h2) increases in the rotation direction (R) of the external rotor.

3. The claw pole motor as defined in claim 2, wherein obliquely extending edges are provided in the same manner on the side of the claw poles of said two stator pole pieces, and said obliquely extending edges are provided on the side of the respective claw pole facing away from the axial bearing.

4. The claw pole motor according to claim 1, wherein in at least a portion of the claw Poles projecting toward the axial bearing, at least one cutout is provided, said cutout extending in the rotation direction (R) from a leading side edge of the respective claw pole into said claw pole with a magnetically effective width decreasing in the rotation direction (R).

5. The claw pole motor as defined in claim 4, further comprising at least one stiffening strut subdividing the cutout.

6. The claw pole motor as defined in claim 5, wherein the at least one stiffening strut extends substantially in the axial direction.

7. The claw pole motor as defined in claim 1, further comprising a rotor base, a rotary shaft (40) fixed to the rotor base, and wherein said rotary shaft is held in contact against an axial bearing of the motor by a magnetic force (F) effective between the interior stator and said rotor magnet.

8. The claw pole motor as defined in claim 1, wherein an axial extension of the claw poles of the stator pole piece located closer to the axial bearing is at least partially smaller than an axial extension of the claw poles of the other stator pole piece.

9. In a claw pole motor;

having an external rotor in the form of a rotor cup, on whose base a shaft is mounted, and in which a rotor magnet is arranged;

having a stator comprising, on its side facing away from the rotor base, a first soft ferromagnetic stator pole piece provided with first claw poles projecting toward the rotor base, and that comprising, on its side facing toward the rotor base, a second soft ferromagnetic stator pole piece provided with second claw poles projecting away from the rotor base and having a greater axial extension (h2) than the first claw poles and projecting into gaps provided between the first claw poles;

having an axial bearing supporting the end of the shaft facing away from the rotor base; and said rotor magnet being axially offset, relative to the stator, in a direction away from said axial bearing in order to generate a magnetic force (F) acting on the axial bearing.

10. The claw pole motor as defined in claim 9, wherein
the first stator pole piece is arranged on a circuit board on which a galvanomagnetic sensor is arranged in the region of an end face of the rotor magnet provided on the rotor cup.

11. The claw pole motor as defined in claim 10, wherein said galvanomagnetic sensor is arranged in a recess of the circuit board.

12. The claw pole motor as defined in claim 11, wherein the galvanomagnetic sensor is radially offset, toward the rotation axis of the motor, with respect to a position directly opposite the end face of the rotor magnet.

13. The claw pole motor as defined in claim 9, wherein the end face of the rotor magnet facing toward the galvanomagnetic sensor is separated therefrom by an axial air gap constituting at least a part of the axial offset between stator and rotor.

14. The claw pole according to claim 13, wherein said rotor magnet has an axial length and said stator has an axial length substantially identical with the axial length of said rotor magnet.

15. The claw pole motor as defined in claim 9, wherein the axial bearing is configured as a plain bearing between a free end of the shaft and a stator-mounted part.

\* \* \* \* \*

UNITED STATES PATENT AND TRADEMARK OFFICE
CERTIFICATE OF CORRECTION

PATENT NO. : 6,281,616 B1
DATED : August 28, 2001
INVENTOR(S) : Burgbacher et al.

It is certified that error appears in the above-identified patent and that said Letters Patent is hereby corrected as shown below:

Column 4,
Line 57, "f2on" should be -- f2 on --.
Line 64, "f2add" should be -- f2 add --.

Column 5,
Line 13, "f2is" should be -- f2 is --.
Line 14, "f1is" should be -- f1 is --.

Column 7,
Line 39, "α" should be -- ∝ --.

Column 8,
Line 21, "Poles" should be -- poles --.
Line 45, ";" should be -- , --.
Line 53, "that" should be deleted.

Column 10,
Line 4, after "pole" -- motor -- should be inserted.

Signed and Sealed this

Fourteenth Day of May, 2002

Attest:

JAMES E. ROGAN
*Attesting Officer*      *Director of the United States Patent and Trademark Office*